United States Patent [19]

Salmond et al.

[11] Patent Number: 5,956,895
[45] Date of Patent: Sep. 28, 1999

[54] CROP

[76] Inventors: Colin Herbert Salmond, Old Peachester Road, Beerwah, Queensland, 4519; Peter John McGruddy, Menary Road, Nambour, Queensland, 4560, both of Australia

[21] Appl. No.: 08/813,938

[22] Filed: Mar. 3, 1997

Related U.S. Application Data

[63] Continuation of application No. 08/362,565, filed as application No. PCT/AU93/00322, Jul. 1, 1993, abandoned.

[30] Foreign Application Priority Data

Jul. 1, 1992 [AU] Australia ................................ PL3281

[51] Int. Cl.⁶ .............................. A01B 79/00; A01G 23/02
[52] U.S. Cl. .................................... 47/58; 47/73; 356/128
[58] Field of Search ........................... 47/58, 73; 356/128

[56] References Cited

U.S. PATENT DOCUMENTS

| | | | |
|---|---|---|---|
| 3,468,607 | 9/1969 | Sloane et al. | 356/73 |
| 3,999,856 | 12/1976 | Unterleitner | 356/130 X |
| 4,650,336 | 3/1987 | Moll | 356/417 |
| 5,131,185 | 7/1992 | Wingerden | 47/86 |

FOREIGN PATENT DOCUMENTS

| | | | |
|---|---|---|---|
| 0194273 | 7/1986 | European Pat. Off. | 47/58 |
| 0494149 | 12/1975 | Russian Federation . | |
| 382388 | 10/1973 | U.S.S.R. | 47/DIG. 1 |
| 404452 | 8/1974 | U.S.S.R. | 47/DIG. 1 |
| 494149 | 12/1975 | U.S.S.R. | 47/DIG. 1 |
| 665859 | 6/1979 | U.S.S.R. | 47/DIG. 1 |
| 810161 | 3/1981 | U.S.S.R. | 47/DIG. 1 |
| 1139389 | 2/1985 | U.S.S.R. | 47/DIG. 1 |
| 1371612 | 2/1988 | U.S.S.R. | 47/58.07 |
| 1604268 | 11/1990 | U.S.S.R. | 47/58.07 |
| 1709956 | 2/1992 | U.S.S.R. | 47/58.07 |
| 90/10377 | 9/1990 | WIPO | 47/58 |
| 92/03907 | 3/1992 | WIPO | 47/58 |

OTHER PUBLICATIONS

Levitt, J., "Chapter 22 Stress Resistance" *Introduction to Plant Physiology* 1969 The C.V. Mosby Company, Saint Louis, U.S.A., pp. 280–286.

*Primary Examiner*—Robert A. Wax
*Assistant Examiner*—Tekchand Saidha
*Attorney, Agent, or Firm*—Young & Thompson

[57] ABSTRACT

Improved crop yields are obtained by determining total dissolved solids (TDS) in a representative sample of transplants to determine strike rate as a logarithmic function of TDS before transplanting. Juvenile plants with high strike rate readings are transplanted. A refractometer having a logarithmic scale showing low, medium, and high strike rates as a direct readout from a juice sample is used. A bioregulator can be used to induce high TDS levels prior to transplanting. Particular application is to transplanting strawberry runners.

8 Claims, 7 Drawing Sheets

| | Date | State | Grower | Variety | TDS | Strike | Treatment | Chiller |
|---|---|---|---|---|---|---|---|---|
| 1 | 1 | VIC | 1 | Parker | 0.100 | 0.9500 | Docked Stems | 1.0000000 |
| 2 | 1 | VIC | 2 | Parker | 0.100 | 0.9600 | Docked Stems | 1.0000000 |
| 3 | 3 | VIC | 2 | Tioga | 0.110 | 0.9500 | Docked Stems | 3.0000000 |
| 4 | 2 | NSW | 3 | Tioga | 0.080 | 0.1000 | Docked Stems | 1.0000000 |
| 7 | 3 | VIC | 7 | Chandler | 0.095 | 0.8500 | Docked Stems | 1.0000000 |
| 8 | 3 | VIC | 1 | Chandler | 0.100 | 0.9799 | Docked Stems | N/A |
| 9 | 3 | VIC | 6 | Chandler | 0.110 | 0.9799 | Docked Stems | N/A |
| 10 | 3 | VIC | 8 | Chandler | 0.115 | 0.9799 | Docked Stems | N/A |
| 11 | 2 | VIC | 6 | Chandler | 0.140 | 0.9800 | Docked Stems | 1.0000000 |
| 12 | 2 | VIC | 5 | Douglas | 0.090 | 0.9400 | Docked Stems | 1.0000000 |
| 15 | 3 | VIC | 11 | Selvn | 0.130 | 0.9600 | Docked Stems | 4.0000000 |
| 17 | 3 | VIC | 5 | Parker | 0.115 | 0.9500 | Docked Stems | 1.0000000 |
| 18 | 3 | NSW | 3 | Tioga | 0.080 | 0.2500 | With Leaves | 3.0000000 |
| 19 | 3 | QLD | 12 | Tioga | 0.090 | 0.3500 | With Leaves | 0.2857143 |
| 20 | 2 | NSW | 3 | Tioga | 0.090 | 0.3000 | Docked Stems | 1.0000000 |
| 21 | 3 | VIC | 2 | Parker | 0.085 | 0.9960 | Docked Stems | 1.0000000 |
| 22 | 3 | VIC | 6 | Chandler | 0.130 | 0.9980 | Docked Stems | 2.0000000 |
| 23 | 3 | VIC | 11 | Chandler | 0.120 | 0.9700 | Docked Stems | 2.0000000 |
| 24 | 3 | VIC | 6 | Chandler | 0.125 | 0.9980 | Docked Stems | 2.0000000 |
| 25 | 4 | QLD | 10 | Qld Red | 0.100 | 0.9900 | With Leaves | 0.1428571 |
| 27 | 4 | QLD | 13 | Tioga | 0.075 | 0.1000 | With Leaves | 0.1428571 |
| 28 | 4 | VIC | 2 | Pahrro | 0.120 | 0.9950 | Docked Stems | 1.0000000 |
| 29 | 4 | QLD | 14 | Tioga | 0.090 | 0.9700 | With Leaves | 0.1428571 |
| 30 | 4 | QLD | 14 | Qld Red | 0.095 | 0.9500 | With Leaves | 0.1428571 |

FIG. 1

| | Date | State | Grower | Variety | TDS | Strike | Treatment | Chiller/wks |
|---|---|---|---|---|---|---|---|---|
| 31 | 4 | NSW | 3 | Tioga | 0.09 | — | Defoliated 6.0 | — |
| 32 | 5 | NSW | 3 | Tioga | 0.11 | 12% | Defoliated 6.0 | 6–7 |
| 33 | 4 | NSW | 3 | Tioga | 0.13 | 8% | Defoliated 5.0 | 6–7 |
| 34 | 4 | NSW | 3 | Tioga | 0.10 | 14% | Defoliated 5.0 | 4–5 |
| 35 | 4 | NSW | 3 | Tioga | 0.10 | 18% | Defoliated 5.0 | 4–5 |
| 36 | 4 | NSW | 3 | Tioga | 0.105 | 12% | Defoliated 5.0 | 4–5 |
| 37 | 4 | NSW | 3 | Tioga | 0.10 | 9% | Defoliated 5.0 | 4–5 |
| 38 | 4 | VIC | 3 | Tioga | 0.15 | 40% | Defoliated 4.0 | 4–5 |
| 39 | 4 | VIC | 2 | Tioga | 0.155 | 10% | Defoliated 4.0 | 6–7 |
| 40 | 4 | VIC | 1 | Parker | 0.14 | 80% | Defoliated 4.0 | 6–7 |
| 41 | 4 | VIC | 1 | Parker | 0.145 | 48% | Defoliated 4.0 | 6–7 |
| 42 | 4 | NSW | 3 | Tioga | 0.13 | 8% | Defoliated 5.0 | 6–7 |

FIG. 3

|  | BED 1 CCC (40,000 ppm) | BED 2 CCC (30,000 ppm) | BED 3 CCC (20,000 ppm) | BED 4 CCC (1,000 ppm) | BED 5 CCC (Control No Spray) |
|---|---|---|---|---|---|
| Mother Plants TDS% | 16.6<br>16.4<br>14.8<br>12.0<br>10.4 | 15.4<br>13.8<br>11.4<br>9.2<br>— | 17.2<br>16.6<br>14.4<br>13.6<br>— | 11.6<br>11.2<br>10.2<br>—<br>— | 10.6<br>10.2<br>—<br>—<br>— |
| Runner Plants TDS% | 11.4<br>11.0<br>9.4 | 11.0<br>10.8<br>9.4 | 11.0<br>10.8<br>— | 11.2<br>11.0<br>— | 9.4<br>7.8<br>— |

FIG. 6

CROP

This application is a continuation of application Ser. No. 08/362,565, filed Feb. 28, 1995, now abandoned, which is a 371 of PCT/AU93/00322 filed Jul. 1, 1993.

TECHNICAL FIELD OF THE INVENTION

This invention relates to an improved crop and to a process for reducing plant losses or enhancing plant recovery following stress related procedures, including but not limited to transplanting or pruning procedures.

BACKGROUND ART

The success of ventures involving commercial use of plants including fruiting plants involves risks. Risks arise as a consequence of many variables. These include inter alia, the weather, unexpected climatic variations, the quality of juvenile plants and timing of artificially induced events, such as planting in relation to anticipated seasonal events and so forth. Many of these variables cannot be quantified and where, for example, planting takes place too late or too early and say, anticipated seasonal changes do not occur as hoped, or adverse weather interferes with events, the yield from a crop can be adversely effected. A venture can become unprofitable.

It is known that yield can be improved in mature plants by a process known as pruning. While the yield of the pruned plant compared to the unpruned plant is increased, the yield is not necessarily maximised because the yield depends on the plant's recovery from pruning induced stress. Similarly, where juvenile plants are transplanted, particularly where commercial numbers are concerned, plant losses occur as some plants cannot recover from the transplanting procedure. Moreover, recovery rates in a transplantation can be slow and this in turn can also effect overall yield. These problems are exacerbated in the large scale commercial environment as a 20% or even 10% reduction in yield from year to year can mean the difference between profit and loss.

At present, conditions considered appropriate to application of induced stress such as pruning or transplanting are evaluated on a qualitative basis having regard to, inter alia, season and visual appearance of plants. The applicant has found that the latter test can be deceptive inasfar as assessing a plant's ability to withstand artificially induced stresses, particularly those associated with transplanting.

OUTLINE OF THE INVENTION

It is therefore an object of the present invention to alleviate at least to some degree the aforementioned problems of the prior art.

In one aspect therefore, the present invention resides in a crop having on average an improved yield due to a reduced plant loss rate or enhanced plant recovery rate following transplanting, pruning or like stress related procedures, the crop comprising, a plurality of plants, the plants having been selected according to a representative sample of said plants being quantitatively confirmed as being in a relatively high stress tolerance phase, said selection being according to a measurable characteristic of the representative sample of said plants being indicative of the plants being in the relatively high stress tolerance phase, prior to the stress related procedure being carried out.

In a further aspect, the invention resides in a process for reducing plant loss or enhancing plant recovery after subjecting a plant to artificially induce stress such as transplanting operations, pruning operations or the like, the process comprising the steps of:

(a) prior to subjecting the plant to the artificially induced stress, quantitatively confirming that the plant is in a relatively high stress tolerance phase by determining the state of the plants energy according to a measurable internal characteristic of said plant, said measurable characteristic being indicative of the plant being in said relatively high stress tolerance phase; and (b) subsequently subjecting the plant to the artificially induced stress before said plant enters a relatively low stress tolerance phase.

In another aspect, the invention resides in a culling process for eliminating a high proportion of plants having relatively low stress tolerance from a plurality of independent plant populations, each plant population comprising a plurality of plants which are of the same production lot from a specific source, the culling process comprising the steps of:

(a) selecting a representative sample of plants corresponding to each population;

(b) quantitatively ascertaining whether said representative sample of plants is in a relatively low stress tolerance phase by determining the state of the plants' energy reserves or a relatively high stress tolerance phase according to a measurable internal characteristic of said plants in said sample being indicative of the plants' tolerance to stress; and (c) subsequently culling those populations of plants that correspond to the representative sample of plants which have been ascertained as being in a relatively low stress tolerance phase.

In a still further aspect, the invention resides in a process for preparing and selecting plants suitable for being subjected to artificially induced stress such as transplanting or pruning, the process including the steps of:

(a) selecting a representative sample of plants from a plant population, the plants of which are from the same production lot from a specific source;

(b) quantitatively ascertaining whether said plants in said representative sample are in a relatively high stress tolerance phase or a relatively low stress tolerance phase by determining the state of the plants' energy reserves according to a measurable internal characteristic of said plants in said sample said measurable characteristics being indicative of said plants being in a relatively low or a relatively high stress tolerance phase;

(c) where said plants in said sample are shown to be in a relatively low stress tolerance phase, select all said plants in said population as being substantially stress intolerant and set them aside as being unsuitable to be subjected to said artificially induced stress; and (d) where said population has been set aside as being in a relatively low stress tolerance phase then subject said population to a process adapted to artificially induce a relatively high stress tolerance phase in said population;

(e) subsequently select a further representative sample from said population that has been subjected to said process adapted to artificially induce a relatively high stress tolerance phase;

(f) quantitatively ascertain whether said plants in said further representative sample have reached or have failed to reach an induced relatively high stress tolerance phase according to a measurable internal characteristic of said plants in said further representative sample said measurable internal characteristic being indicative of a plant being in a relatively high or relatively low stress tolerance phase; and (g) where said plants in said further sample are shown to be in a relatively high stress tolerance phase select all said plants in said population as having been successfully artificially induced into a relatively high stress tolerance phase as being substantially stress tolerant and set them aside as being suitable to be subjected to said artificially induced stress; and (h) where said plants in said further sample are shown to be in a relatively low stress tolerant phase, then repeatedly carry out steps (d) to (h) until said population has been set aside according to step (g) as being suitable to be subjected to said artificially induced stress.

In a still further aspect, the invention resides in an apparatus suitable for quantitatively ascertaining whether a plant is in a relatively high stress tolerance phase or a relatively low stress tolerance phase, the apparatus having a plant sample receiving station and a readout means adapted to provide a direct readout of a measurable characteristic of said plant sample indicative of the plant from which said plant sample has been taken as being in a relatively high or relatively low stress tolerance phase. Preferably, the direct readout provides an average measure of a whole population of related plants tolerance to stress as an average mortality or recovery rate related figure indicative of the stress tolerance of the population derived from a sample located in said sample receiving station.

The present invention can be applied to any crops where it is desirable to optimise yield by firstly identifying and optimising the time at which plants are subjected to induced stress so that afterwards a relatively high recovery rate can be expected. The following description is to one application of the present invention to commercial strawberry production and is merely illustrative.

In the life of a strawberry plant, it is subjected to artificially induced stress. For example, juvenile plants, known as runners, are purchased from runner nurseries and transplanted by the strawberry grower. The yield from a crop of strawberries depends on, inter alia, the time at which planting takes place and the strike rate. The strike rate is a measure of the percentage of runners surviving following transplanting. The strike rate is therefore a measure of the tolerance of the crop to the transplanting procedure, assuming that normal external factors are constant. Prior to the present invention, transplanting has been subject to sporadic variations in strike rate, sometimes strike rates as low as 80% are recorded despite the runners, from a visual point of view, being healthy and also disease free. The applicant has found that runners which are disease free and visually sound may not be able to cope with transplanting because these plants can be in a relatively low stress tolerance phase which reduces the probability of the plant surviving which in turn reduces strike rate and hence, yield.

In the second and sometimes following years from transplanting, mature plants are subjected to a process known as "ratooning" where plants are cut-back or pruned. The yield depends on when ratooning takes place and how the plants recover from ratooning. The time at which and the amount by which plants are cut back is usually determined on a qualitative basis.

As mentioned above, the processes disclosed herein and the apparatus mentioned above involve quantitatively ascertaining whether a representative sample of plants in a population is in a relatively low stress tolerance phase or a relatively high stress tolerance phase. The applicant has developed a procedure for ascertaining the stress tolerance phase of a plant, the preferred procedure in relation to strawberry plants and which can also be used for other plants involves ascertaining the "Total Dissolved Solids" (TDS) as a measure of the carbohydrate level and therefore energy stores of a plant. A plant with higher energy reserves is in a relatively high stress tolerance phase while a plant with lower energy reserves is in a relatively low stress tolerance phase. The applicant has found that stress tolerance varies exponentially so there is a fairly sharp threshold at which healthy plants become less tolerant to stress therefore qualitative tests are and have been in the past unsatisfactory in determining this important factor.

Total dissolved solids is determined by juicing a sample of a plant and then measuring the refractive index of the uncontaminated sample. In the case of strawberries, the sample can originate from any part of the plant including the leaves and roots but preferably, the sample is sourced from the crown and in older plants, the sample is sourced from the crown adjacent the top of the crown. The crown or part of the crown can be juiced and the TDS determined and from this, the applicant has devised a method for ascertaining the stress tolerance phase for the plant. The applicant has found the stress tolerance phase determined for a single plant or representative group of plants can be extrapolated to a population of plants which share a common origin and history with the sample plant or plants to obtain an average figure of tolerance and make predictions for the population.

An apparatus suitable for ascertaining the TDS is a refractometer where the refractive index of a juice sample relative to the refractive index of distilled water provides a measure of total dissolved solids and from the following description, it will be seen that the stress level or in the case of transplants, the strike rate is related to TDS is in terms of a logarithmic relationship. Therefore, the present invention includes a direct readout refractometer having a logarithmic scale indication of stress level. Typical quantitative measures that can be used as convenient and direct indications of a populations overall capability of coping with stress is a readout of "strike rate" for transplants, "recovery rate" for pruned plants and so forth. The applicant has found that these measures reflect on observable plant characteristics arising in a population following stress and these are related to the TDS measured for the sample plants.

BRIEF DESCRIPTION OF THE DRAWINGS

In order that the present invention can be more readily understood and be put into practical effect, reference will now be made to the accompanying drawings which illustrate one embodiment of the present invention as applied to strawberry plants and wherein:

FIG. 1 is a table illustrating applications of the teachings of the present invention to transplantation of strawberry runners;

FIG. 3 is a table illustrating the effect of long term storage of strawberry runners on strike rate;

FIG. 6 is a table illustrating induced relatively high tolerance in strawberry runners using a bio-regulator.

METHOD OF PERFORMANCE

Figure 2:
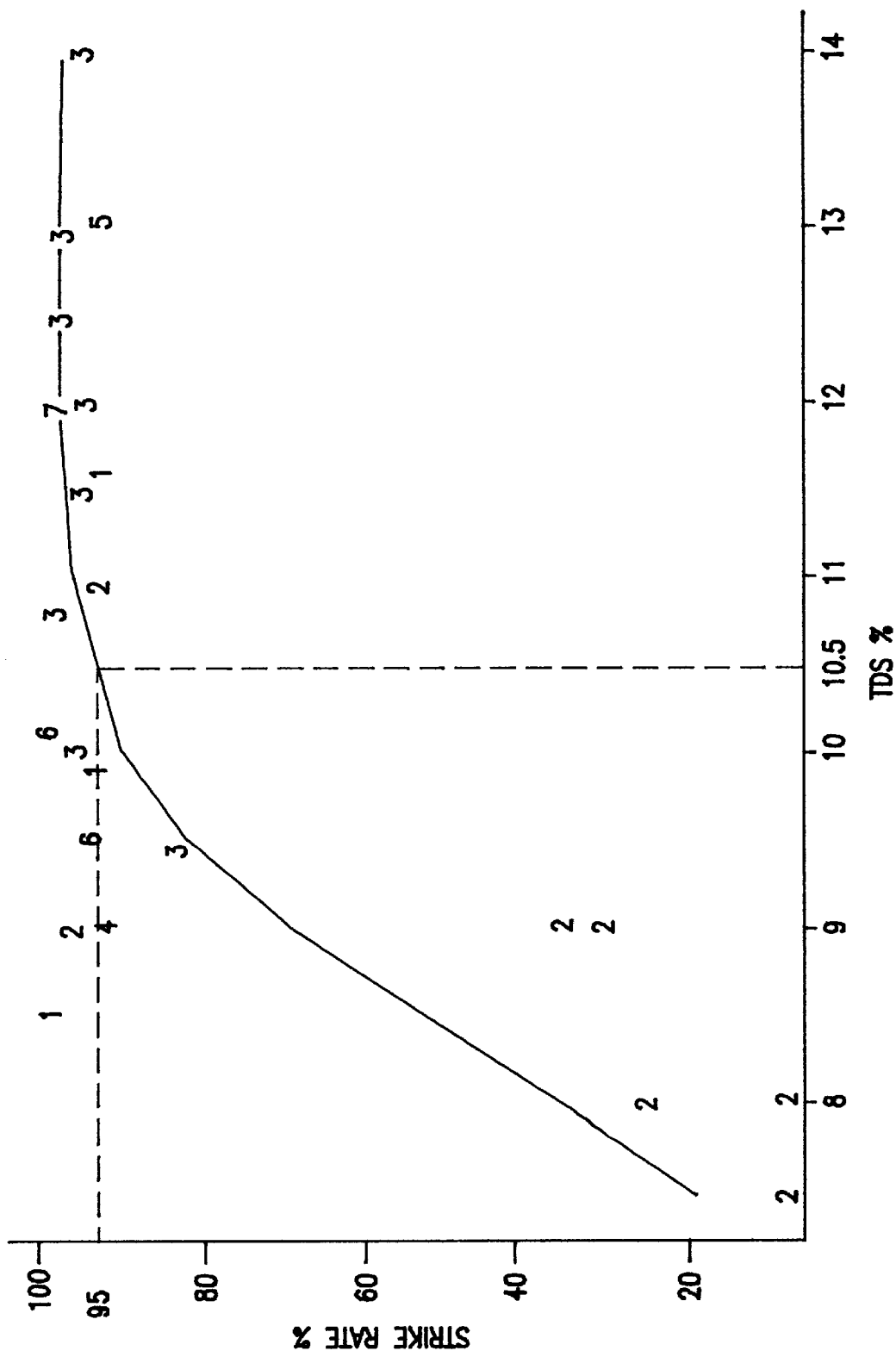
FIG. 2 is a graphical illustration of the data in FIG. 1 showing the relationship between strike rate, being a measure of the tolerance of a population of plants to transplanting as plotted against TDS readings.

Referring to FIG. 1, the table illustrates the measured relationship between TDS and strike rate for representative samples of strawberries from separate populations. Representative samples of strawberry runners from boxes of strawberry plants originating from different runner nurseries were tested to determine an extrapolated TDS value for the population of runners in the box. Each runner nursery was given a code, this code is listed in column 4 of the table with the state of origin being listed in column 3. Samples were prepared by extracting juices from the crowns, roots and leaves by placing these in a domestic juicer. After each sample was processed, the juicer was disassembled, washed, dried and reassembled before processing the next sample. Six plants were selected randomly from each box for the purpose of measurement. The variety, whether the stems had been docked, and the time (in weeks) the box of plants had been in cold storage is also given in the table.

A Carl Zeiss Jena refractometer number 236135*f ⅔ with 0% to 30% indices was used to read the total dissolved solids percentage (TDS) and readings were rounded to 0.5%. The refractometer used is commonly used to make total dissolved solids readings in relation to sugar cane and has a plus or minus 0.2% error factor but due to the cloudiness of the samples, the observed error rate was plus or minus 0.5%. The applicant has found that the error can be reduced by using a more coherent light source rather than natural light and to this end, a preferred form of refractometer uses a more coherent light source, typically a laser light source is used.

After measurements, the runners were transplanted and strike rates listed in the table were recorded from grower interviews a week from transplanting.

Readings were taken in a temperature range of 19° C. to 22° C., a temperature compensation table was not used for at these temperatures, the variations were 0.06° to 0.13°.

The boxes contained Department of Agriculture approved runners from Victoria and New South Wales. Local Sunshine Coast runners were also sampled. Queensland certified runners were not available. Nine varieties of runners were sampled from ten certified scheme nurseries. Forty-eight samples were recorded for TDS however only thirty-two strike rates at present are available.

Runners from populations revealed to have low strike rates were pathology tested and later after two weeks in the field to eliminate disease as a cause of the low strike rates. Other factors considered in relation to the low strike rates were reasonable grower management control of other perimeters such as drying of roots in the planting process; crowns planted below the soil level; inadequate land/tilth preparation; lack of drainage of water; planting too early after fumigation and damaged by malfunctioning chillers were eliminated as causing the low strike rates. Strike rates could therefore be directly attributed to characteristics of the plants revealed by the TDS measurements.

For a sample runner, the leaves and stem gave a TDS of 7%. The crown gave a TDS of 8%; and the roots gave a TDS of 5%. It was therefore apparent that TDS measurements could adequately be carried out in relation to the leaves, roots and crown but it is considered preferable to carry out tests in relation to the crown as this is believed to be the main storage centre for carbohydrate reserves.

FIG. 2 illustrates the plot of a strike rate prediction curve and graphs TDS as a percentage against the strike rates.

The following prediction equation has been derived from the fitted values and may also be used to estimate strike rate once the TDS is known from a representative sample of strawberry plants.

The prediction equation is as follows:

$$E[\log(y/(1-y))] = -12.7936 + 151.5880 * TDS$$

In this equation y is the strike rate and as an example, a typical right hand side for the equation would give a value of 5.39696 and this would result in a predicted value of strike rate of 0.9955. This equates to 99.55% strike rate.

While it will be appreciated from the foregoing that commercially available refractometers can be utilised to firstly determine TDS and then from this, the strike rate values can be obtained for a population of plants. On this basis, a box of plants can be rejected if the determined strike rate falls below an acceptable level, the view being that transplanting a box of plants having a low indicted strike rate will result in low yield. As an alternative to using a standard refractometer which includes a linear scale for determining the TDS values, the novel refractometer according to the present invention can be utilised and as can be seen above, according to the prediction equation, the relationship between TDS and strike rate is logarithmic. Accordingly, a logarithmic scale of strike rate can replace the normal linear scale having regard to the two constants referred to in the prediction equation. Under these circumstances, a direct reading of strike rate as a percentage can be obtained for each sample.

An example is illustrated in FIGS. 4A to 4D which show the visual indication that would be present on the specially designed refractometer.

Figure 4A:
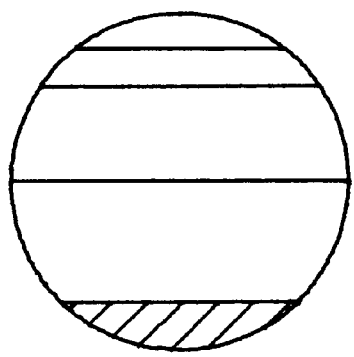
FIGS. 4A to 4D are schematic diagrams illustrating typical scales and readings from a direct readout refractometer for predicting strawberry plant strike rate.

The shaded area shown in FIG. 4A represents the visual indication for distilled water and is used to calibrate the refractometer to a zero line reading. As can be seen, the scale is divided into three logarithmic regions which correspond respectively to low, medium and high strike rate regions.

Figure 4B:
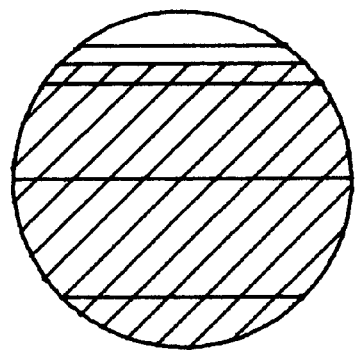
Figure 4C:
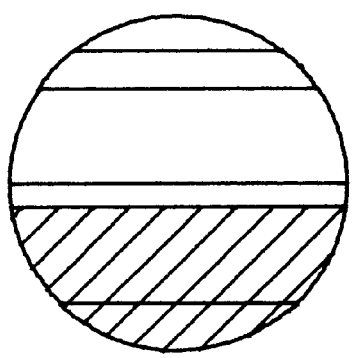
Figure 4D:
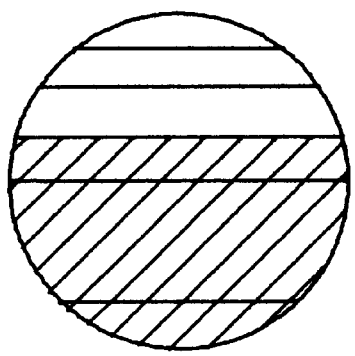

Thus, in FIG. 4B, the shaded area extends into the high strike rate region, in FIG. 4C into the low strike rate region and then into FIG. 4D into the medium strike rate region.

It is to be noted that measurements for TDS were also made in chilled boxes of runners that were retained in refrigeration for over six weeks. Sample readings of TDS were taken at four, five and six week intervals. Visual observations of plant discolouration were noted at each interval, reflecting chlorophyll depletion. It was discovered from this that when chlorophyll levels are high (yellowish green, bluish appearance) and TDS readings were high and storage time was a minimum, then strike rates were highest, but if chlorophyll levels were low (black with whitish buds) and although a higher TDS reading could be achieved, the strike rates still remain low. Thus, low chlorophyll levels resulted in low strike rates independent of high TDS readings. Contrast to this, if chlorophyll levels were high but the TDS was low, the strike rate was also poor. Clearly, another factor in relation to stress is the plants overall condition. The present invention allows healthy plants to be culled.

Although TDS rose proportional to chiller storage time, it did not make the plants any more vigorous, because chlorophyll levels depleted proportional to time in the chiller. When the low chlorophyll plants were planted, loss occurred primarily due to chlorophyll depletion other than a plant being in a healthy fresh condition. The results of these tests are given in FIG. 3. The present invention therefore has its primary application in relation to healthy fresh runners.

The above illustrates application of the present invention to culling populations of plants received from runner nurseries and transplanting only those populations of plants which give a higher strike rate reading. Thus, a crop being transplanted following measurement, with all other factors being even, will result in a higher fruit yield on average compared with populations that have not been subjected to the present invention.

Figure 5:
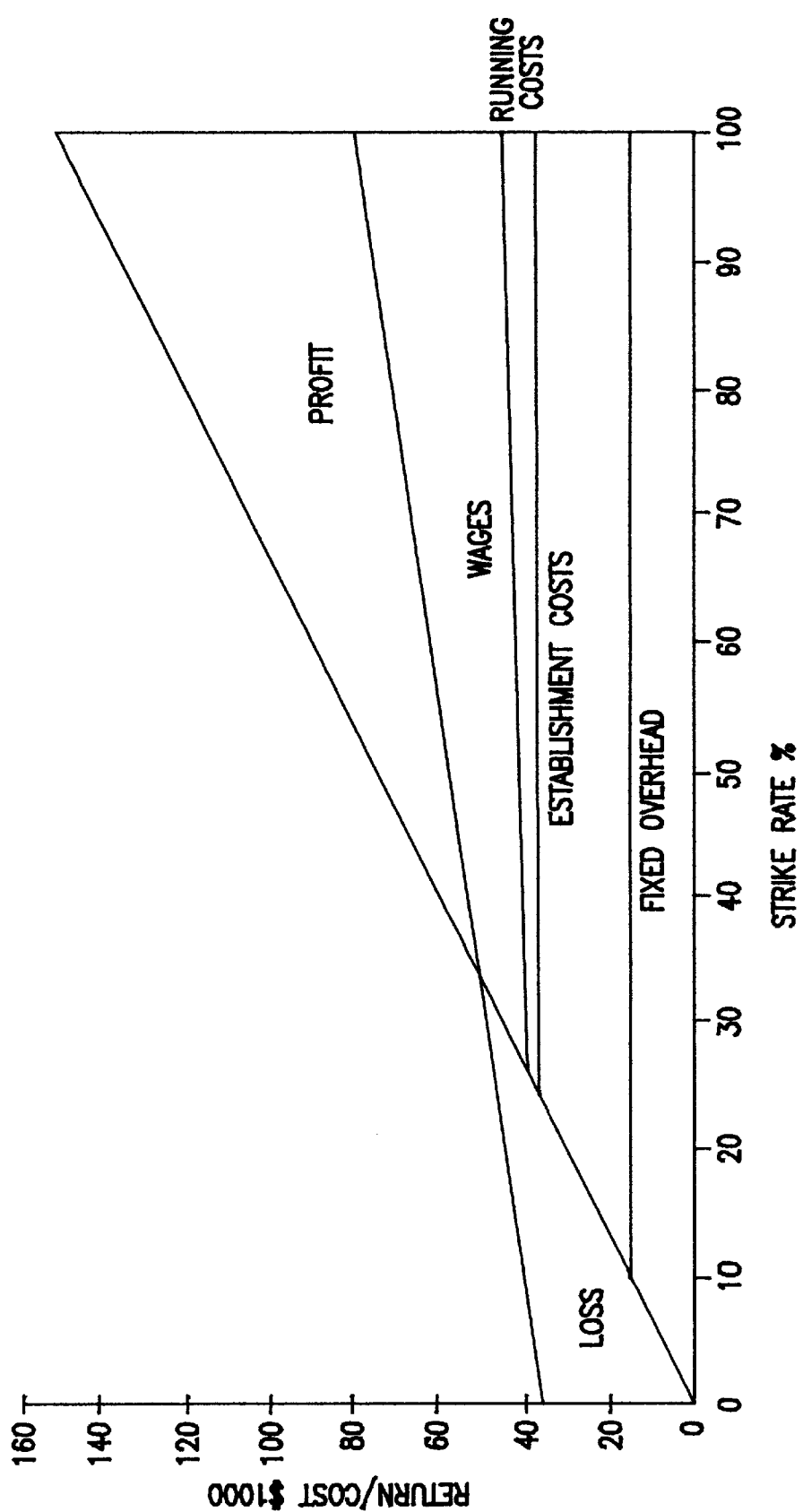
FIG. 5 is a diagram illustrating a break even analysis for the costs of running a strawberry plantation according to plant strike rate.

The importance of achieving a high strike rate is shown in FIG. 5 where the profit required to finance the following seasons crop is in the 95% to 100% strike rate range.

Notwithstanding the above, the present invention can be applied in other situations to enhance yield. As will be appreciated from the foregoing, discarding or culling plants which potentiate a low strike rate is an expensive waste of runners and by utilising the present invention prior to digging runners only those runners which are in the relatively high stress tolerance phase need be dug. The low tolerance phase runners can be dug once they have moved into the higher stress tolerance phase. The present invention also envisages artificially induced relatively high stress tolerance phase of growth and the applicant has discovered that this can be brought about by hormonal partitioning using a bio-regulator accompanied by periodic measurements of strike rate using the present invention before digging.

Figure 7:
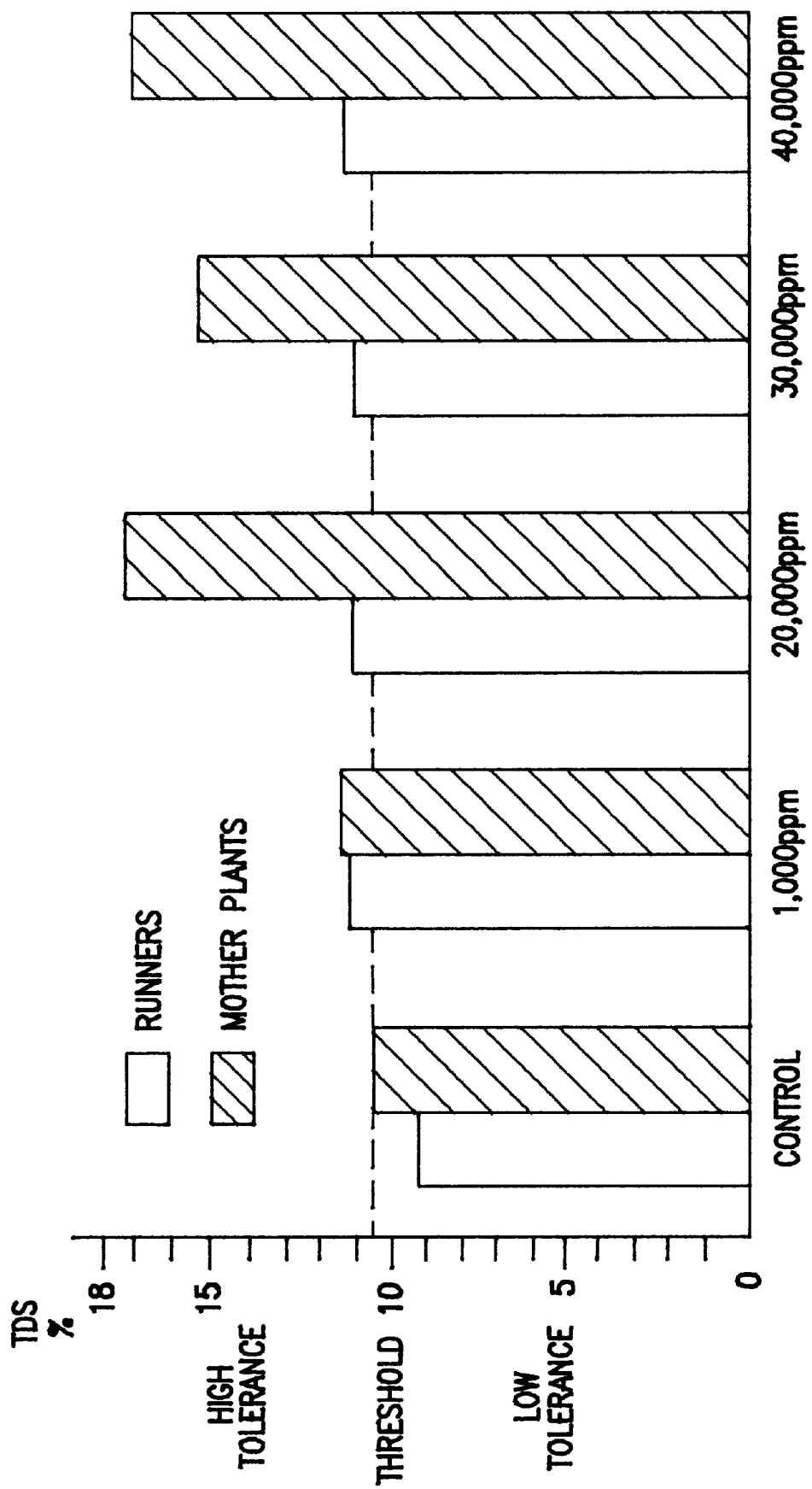
FIG. 7 is a graphical representation of the data given in the table of FIG. 6.

For example, results of a test conducted on strawberry runners is illustrated in FIGS. 6 and 7, five runner bed plots were selected with each plot being 2 m square. Due to the lateness of this test (June, 1992) with resultant low temperatures, clear plastic sheets were suspended over the five beds to maintain night temperatures greater than 15° C. and daylight temperatures around 25° C.

The applied bio-regulator used was CCC at four different rates, 1000 ppm, 20000 ppm, 30000 ppm and 40000 ppm of water. To each spray mix, 0.1% of non-ionic wetting agent AGROL 60 was added.

One spray only by a hand held pressure spray was applied to dripping stage.

Bed 1 received the 40000 ppm, bed 2 the 30000 ppm, bed 3 the 20000 ppm, bed 4 the 1000 ppm and bed 5 was the control bed with no spray, however this bed was also covered with plastic in similar fashion to the other beds.

Untreated runners outside the plastic cover were retained for additional control readings.

Prior to spraying with the CCC, sample TDS readings were randomly taken of the beds of runners and the mother plants separately to measure carbohydrate levels.

The trivial name of the bio-regulator chosen for this test was chormequat chloride—cycocel or CCC. Its systematic name is (2-chloroethyl) trimethyl ammonium chloride.

TDS was measured in the crowns of sampled runners following the application of the bio-regulator and these measurements were taken seven days after application. The mother plants showed an increase in TDS over the seven days while the treated runners displayed similar results.

What is understood to have occurred is the partitioning hormone CCC triggered the plants into a storage phase, thereby causing the runner and mother plants to translocate sucrose into the crown, thereby increasing TDS, with the greatest increase of TDS at higher CCC concentration levels.

As it will be appreciated that the increase in the TDS under these circumstances can then be related back to the strike rate visible in FIG. 2 and once this artificially induced increase in TDS has been obtained above the required survival threshold, the runners can be dug and used for transplanting purposes and losses minimised. As will be seen from FIG. 7, the application of the bio-regulator has induced a TDS above the 10.5% threshold thereby improving stress tolerance and increasing strike rate from 80% to 95%. Induction in relation to the runners is independent of the amount of CCC used. However, in the mother plants, high CCC level resulted in marked increases in TDS. This is believed useful in relation to ratooning and this will be discussed below.

Another circumstance in which the present invention can be utilised is in relation to the process known as ratooning which involves pruning existing plants back to improve yield in the next season. Prior to the ratooning process, sample plants can be tested according to their TDS values and depending upon whether the TDS is above the threshold, ratooning can be delayed until the TDS has reached the threshold. Alternatively, artificially induced higher tolerance levels can be obtained using the format set out above in relation to the bio-regulator prior to ratooning. This is illustrated above in relation to the mother plants referred to in FIGS. 6 and 7 which are representative of induced stress tolerance in older plants. Once the bio-regulator has been used, further TDS tests can be conducted and once the TDS levels have increased sufficiently, the ratooning process can be carried out. Tests may not be needed but should be made in case unduly heavy dews or rains may have reduced the effectiveness of spray application of bio-regulator. Under these circumstances, on average, the plants will recover much quicker than if the ratooning process had been carried out using prior techniques with the chance of plants being in a relatively low stress tolerance phase. Using the present invention, plants will recover quicker and yield will be improved.

Other advantages of the bio-regulator which have been perceived by the applicants as being useful and beneficial are as follows:

1. Effects are measurable within one week;
2. Plants are sturdier and more compact;
3. Leaves are thicker and darker green indicating high chlorophyll levels;
4. Treated plants are more resistant to fungicidal and bacterial disease, e.g. verticillium wilt;
5. Flower size is usually not affected;
6. Plants show resistance to various insect pests, e.g. aphids;
7. The microbiology of the planting environment is not affected;
8. CCC decomposes quickly, is inactive after two weeks and is gone in less than a season; and
9. There is no effect on seed development or ripening.

It will be appreciated from the foregoing examples of how the present invention can be used to create an improved crop that the present invention has general application. Therefore the above has been given by way of illustrative example of the present invention and many variations, modifications and different applications of the present invention will be apparent to those skilled in the art without departing from the broad ambit and scope of the invention as set forth in the appended claims.

We claim:

1. A process for reducing plant loss or enhancing plant recovery after subjecting a plant to artificially induced stress such as transplanting operations or pruning operations, the process comprising the steps of:

(a) prior to subjecting the plant to the artificially induced stress, quantitatively confirming that the plant is in a relatively high stress tolerance phase by determining the plant total dissolved solids (TDS), according to a predetermined logarithmic relationship between the TDS and plant recovery from stress; and (b) subsequently subjecting the plant to the artificially induced stress before said plant enters a relatively low stress tolerance phase, as measured by the said logarithmic relationship.

2. A culling process for eliminating a high proportion of plants having relatively low stress tolerance from a plurality of independent plant populations, each plant population comprising a plurality of plants which are of the same production lot from a specific source, the culling process comprising the steps of:

(a) selecting a representative sample of plants from each population;

(b) quantitatively ascertaining whether said representative sample of plants is in a relatively low stress tolerance phase by determining the plant TDS, according to a predetermined logarithmic relationship between the TDS and plant recovery from stress; and (c) subsequently culling those populations of plants that correspond to the representative sample of plants which have been ascertained as being in a relatively low stress tolerance phase as measured by the said logarithmic relationship.

3. A process for preparing and selecting plants suitable for being subjected to artificially induced stress such as transplanting or pruning, the process including the steps of:

(a) selecting a representative sample of plants from a plant population, the plants of which are from the same production lot from a specific source;

(b) quantitatively ascertaining whether said plants in said representative sample are in a relatively high stress tolerance phase or a relatively low stress tolerance phase by determining the plants' TDS, according to a predetermined logarithmic relationship between the TDS and plant recovery from stress;

(c) where said plants in said sample are shown to be in a relatively low stress tolerance phase as measured by the said logarithmic relationship, select all said plants in said population as being substantially stress intolerant and set them aside as being unsuitable to be subjected to said artificially induced stress; and (d) where said population has been shown to be in a relatively low stress tolerance phase as measured by the said logarithmic relationship then subject said population to a process adapted to artificially induce a relatively high stress tolerance phase as measured by the said logarithmic relationship in said stress intolerant population;

(e) subsequently select a further representative sample from said population that has been subjected to said process adapted to artificially induce a relatively high stress tolerance phase;

(f) quantitatively ascertain whether said plants in said further representative sample have reached an induced relatively high stress tolerance phase according to said plants' TDS which is indicative of a plant being in a relatively high or relatively low stress tolerance phase as measured by the said logarithmic relationship; and (g) where said plants in said further sample are shown to be in a relatively high stress tolerance phase as measured by the said logarithmic relationship select all said plants in said population as having been successfully artificially induced into a relatively high stress tolerance phase as being substantially stress tolerant and set them aside as being suitable to be subjected to said artificially induced stress.

4. The process according to claim 3 where step (e) comprises applying a bioregulator to induce the relatively high stress tolerance phase as measured by the said logarithmic relationship.

5. The process according to claim 3 where step (e) comprises applying a hormonal agent to trigger the plants to move from a growth phase to a storage phase.

6. The process according to claim 1 wherein the TDS is a measure of the carbohydrate levels in the plant.

7. The process according to claim 2 wherein the TDS is a measure of the carbohydrate levels in the plant.

8. The process according to claim 3 wherein the TDS is a measure of the carbohydrate levels in the plant.

\* \* \* \* \*